United States Patent [19]
Azadegan

[11] Patent Number: 5,550,643
[45] Date of Patent: Aug. 27, 1996

[54] TRICK-PLAY VCR FOR DIGITALLY CODED VIDEO

[75] Inventor: Faramarz Azadegan, Plainsboro, N.J.

[73] Assignee: Kabushiki Kaisha Toshiba, Kanagawa-ken, Japan

[21] Appl. No.: 362,009

[22] Filed: Dec. 22, 1994

[51] Int. Cl.$^6$ .............................. H04N 5/76; H04N 5/78
[52] U.S. Cl. .............................. 358/335; 360/10.1
[58] Field of Search .............................. 358/335, 310, 358/342, 311; 360/312, 9.1, 10.1, 13, 52, 33.1; 348/384

[56] References Cited

U.S. PATENT DOCUMENTS

| | | | |
|---|---|---|---|
| 5,040,061 | 8/1991 | Yonenitsu | 348/401 |
| 5,136,376 | 8/1992 | Yagasaki et al. | 348/384 |
| 5,335,117 | 8/1994 | Park et al. | 360/48 |
| 5,371,602 | 12/1994 | Tsuboi et al. | 358/335 |
| 5,383,063 | 1/1995 | Bannai et al. | 360/33.1 |

OTHER PUBLICATIONS

Boyce, Jill et al., "Fast Scan Technology for Digital Video Tape Recorders," IEEE Transactions on Consumer Electronics, vol. 39, No. 3 (Aug. 1993).

Primary Examiner—Thai Q. Tran
Assistant Examiner—Robert Chevalier
Attorney, Agent, or Firm—Finnegan, Henderson, Farabow, Garrett & Dunner, L.L.P.

[57] ABSTRACT

A video signal processor receives a digital video input signal containing I-data and other data in random positions in a data frame. A pre-processor separates the frames into the data components. A tessellation of a video screen containing vertical columns and horizontal rows is programmed into the pre-processor. The pre-processor assembles records with the I-data positioned in the records such that a video recorder head, scanning the data in any trick-mode speed, will update sequential rows or sequential columns of the tessellation according to the I-data.

25 Claims, 3 Drawing Sheets

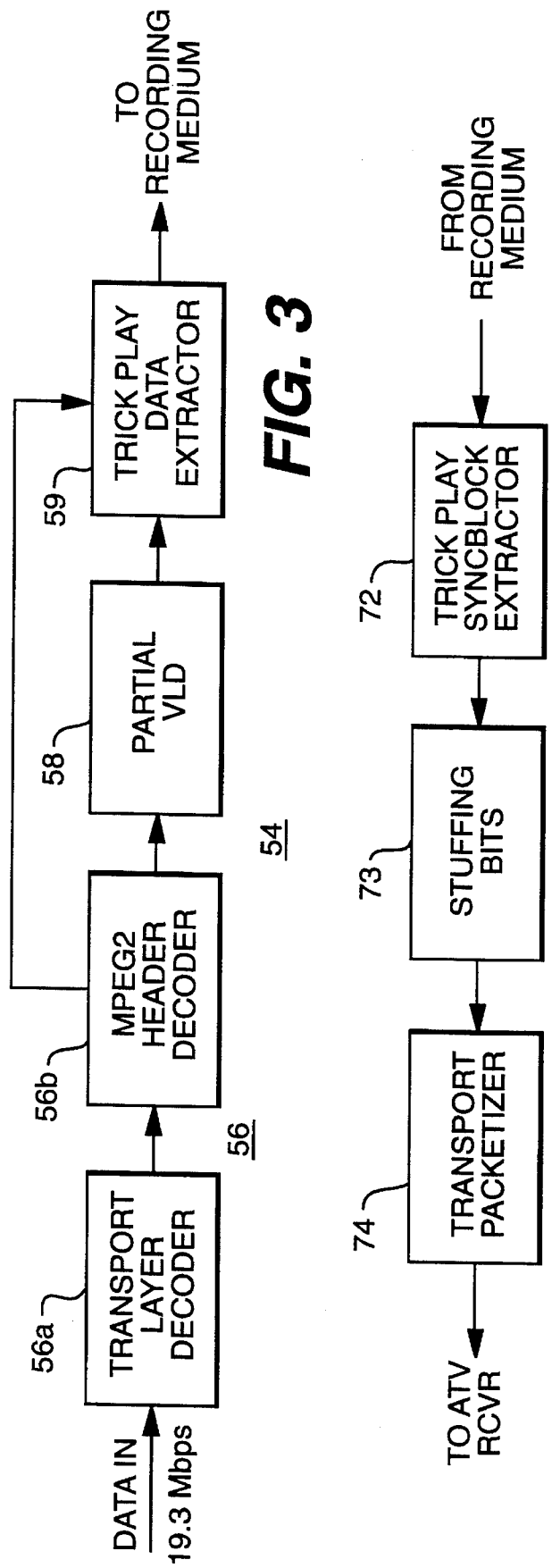
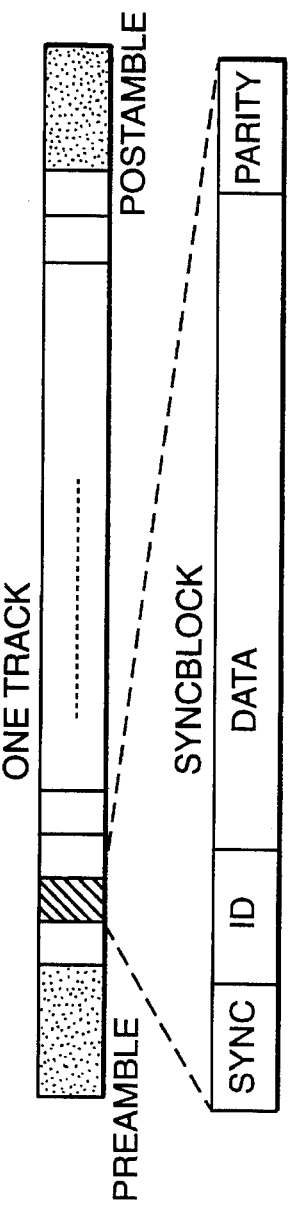

TRICK-PLAY VCR FOR DIGITALLY CODED VIDEO

BACKGROUND OF THE INVENTION

1. Field of the Invention

The invention relates to high data rate methods and systems for recording and playback of digital video signals. More particularly, the invention relates to a method and system for recording and playing back digital video signals on a video recorder such that an acceptable image is provided during any one of a plurality of trick mode speeds.

2. Description of the Related Art

Significant attention has been paid in recent years to the use of digital compression in video for transmitting and storing digital data. Such digital compression schemes are being studied in applications ranging from low bit rate and low resolution video conferencing, to high bit rate and high resolution high definition television (HDTV). These digital video systems are projected to replace the older well-known analog video systems.

A known limitation of analog TV systems is the practical limitation on the data rate, i.e., the effective rate at which the TV signal carries data or picture and sound information. Analog TV systems produce the TV image by rapidly projecting a series of still images or image frames, in essentially the same way a movie film is projected with a series of frames to create a moving picture. The analog TV signal is divided into segments or frames corresponding to the projected frames of the TV image. The full frame of the analog signal is necessary to construct the corresponding full TV image frame. It is difficult or impossible to transmit the analog frames in a more compact form, for example, by eliminating redundant information from frame to frame.

Digital TV systems overcome these limitations by using a digital signal that includes numerical data for each picture element or pixel of the TV image frame. The digital signal is segmented into a bit stream, the bit stream including a series of numbers, ones and zeros, corresponding to the pieces of information organized into data "frames." The organization of these pieces of data within the frame is referred to as the format of the frame. Parenthetically, a digital frame does not correspond one-for-one to a full frame of the TV image. Usually, one digital frame corresponds to only a relatively small portion of a TV image frame. The word "frame" as used in the remainder of this document refers to a digital frame unless otherwise indicated.

Digital technology offers a number of advantages, probably the most important of which is error detection and correction features. The information in the digital signal also can be processed to reduce or eliminate redundancies from frame to frame. Moreover, the digital information can be coded (using a single symbol or small group of symbols to represent a larger number or set of numbers) to increase the efficiency of the data transfer and correspondingly increase the data transfer rate. A processor in the digital TV set can be used to decode the data and use it to project the desired TV image. Techniques for increasing the efficiency of the data while decreasing the redundancy are known as data compression techniques.

Various data compression techniques for coded data have been proposed. A well-known coded data structure is the Moving Picture Expert Group (MPEG) encoding strategy, which is described in "Information Technology—Coding of Moving Pictures and Associated Audio (MPEG-2)," ISO-IEC 13818, International Standards Organization, Geneva, 1993, the contents of which are incorporated herein by reference. The MPEG encoding format reduces redundancies by including various types of data in each data frame, including intraframe (I) data, predictive frame (P) data, and bidirectionally-coded frame (B) data. I-data is stand-alone data that is unique to a frame. P-data and B-data is data that relates to or links two or more frames, e.g. looking back to a previous frame for the desired data, such as motion vector data or residual data. Moreover, the I-data, P-data, and B-data are positioned at random locations within each data frame.

The structure of the compressed digital data, however, creates some new problems which did not exist in the older analog technology. For example, applying digital technology to VCR equipment, and particularly to VCR equipment that is practical for consumer markets, presents a number of challenges. Most importantly, the cost of the systems must be relatively low for market acceptability. The systems also must be able to perform "trick" modes (modes other than normal playback and record), such as various speeds of fast forward (FF) or fast reverse (FR), to enable a customer to browse a tape. It is further desirable that VCRs have various speeds of FF and FR.

The helical scan mechanical recording systems of commercially available VCRs usually are the most expensive component of the VCR system. Commercially available helical scan systems used in most consumer VCRs today have a bandwidth of about 8–15 MHz, and can record or play back at rates up to about 35–40 Mb/s. These helical scan systems are designed to operate with analog TV signals, but they are capable of operating with digital signals as well, at least for data rates that are relatively low. Helical scan systems and rotary heads for VCR applications that are capable of operating at significantly higher speeds commensurate with the full digital signal transmission rates are available, but they are prohibitively expensive for consumer systems. Therefore, it is desirable to have a digital VCR system that uses commercially available, low cost helical scan systems or their substantial equivalents, but which operates at the highest practical data rate.

As used in VCRs of the current analog design, these commercially available, low cost helical scan systems perform trick modes by correspondingly changing the rotational speed of the heads and the translational speed of the recording tape. It is well known that, as the speeds change from the normal recording or playback speeds, the orientation of the moving heads relative to the recorded tracks on the tape cause the heads to scan past the tracks with a steep diagonal trajectory, rather than the normal playback trajectory. For example, FIGS. 1A and 1B show a tape 40 with compressed digital data stored sequentially in consecutive tracks. Solid arrow 42 indicates the trace of the VCR recording/scanning head in a normal play trajectory. The resulting output of the scan will be the same as the input of the scan, assuming the absence of tape errors. Arrow 44 indicates the head scan during one FF mode, while arrow 46 indicates the head scan during one FR mode. These trajectories disturb the signal and the resulting image because the resulting signal comprises only bits and pieces of adjacent frames, rather than the full frames.

In the old analog system, because the analog frames recorded on the tracks of the tape are in analog form, these bits and pieces when combined are sufficient to produce an image that is acceptable to the viewer, although somewhat disrupted. This accounts for the horizontal lines that appear in the video image during fast forward, for example. However, when compressed digital signal formats with variable length coded data are used, standard rotary heads cannot read the data directly during trick modes. This is because the data within the frames is not predominantly the same from frame to frame as in an analog signal. As the heads scan the bits and pieces of the digital tracks, they obtain an unusable mixture of I-data, P-data, and B-data from various frames. The bits and pieces, when used as a signal and displayed, do not produce a viewable TV image. As different speeds of FF and FR are selected (not shown in FIG. 1) no image results because the resulting bitstream is not decodable.

In an effort to solve this problem, proposals have been made to position data frames along the tracks of a recording medium, particularly positioning the I-data within the frames, such that the recording/scanning head, when travelling along a trick mode trajectory, will scan I-data. These related proposals suffer from at least one of the two following drawbacks.

First, most VCRs operate with a primary FF and a primary FR speed; however, many VCRs can also operate with several other FF and FR speeds besides the primary speed. Most related attempts to position I-data to be read in trick mode trajectories typically work only in the primary FF and FR speeds. Others provide an image at several FF and FR speeds, but it is greatly degraded in comparison to the image provided at the primary FF and FR speeds. None of the prior attempts enable sufficient I-data to be read at all FF or FR speeds to consistently reproduce an acceptable image.

Second, the prior attempts required the VCR record/ scanning head to return to a preselected position, e.g. to the beginning of a tape track or to one of the select set of tracks, in order to see the I-data in the FF or FR trajectories. The prior attempts did not enable the record/scanning head to commence its FF or FR trajectory from any position, and still see sufficient I-data to produce a viewable picture.

SUMMARY OF THE INVENTION

Accordingly, the present invention provides an economical and adaptable system and method for processing high data rate digital signals that substantially obviates one or more of the problems created by the limitations of the related art.

The present invention further provides an economical and adaptable system and method for processing high data rate digital signals capable of producing a viewable video image during any one of a plurality of trick modes.

The present invention further provides an economical and adaptable system and method for processing high data rate digital signals capable of producing a viewable video image during any one of a plurality of trick modes regardless of the starting position of a video recorder head.

Additional advantages of the invention will be set forth in the description which follows, and in part will be apparent from the description, or may be learned by practicing the invention. The advantages of the invention may be realized and obtained by means of the apparatus and method particularly pointed out in the written description and claims hereof, as well as the appended drawings.

To achieve these and other advantages, and in accordance with the invention as broadly described herein, the invention includes a method of processing video signals comprising the steps of receiving a digital video input signal comprising a plurality of input frames, each of the input frames including intraframe data and other data in random positions; separating the input frames into the intraframe data and the other data; programming a tessellation of at least a portion of a video screen, the tessellation including vertical columns and horizontal rows; and assembling a plurality of records from the intraframe data and other data with the intraframe data positioned within the records such that when a video recorder head scans the records in any one of a plurality of trick-mode trajectories, either sequential columns-or sequential rows of the tessellation are updated according to the intraframe data.

In another aspect, the invention includes a video signal processor comprising an input terminal for receiving a digital video input signal, the signal comprising a plurality of digital input frames, each of the input frames including intraframe data and other data in random positions; and a pre-processor for separating the input frames into the intraframe data and other data, and for assembling a plurality of records according to a preprogrammed tessellation of at least a portion of a video screen, the tessellation including vertical columns and horizontal rows, with the intraframe data positioned within the records such that when a video recorder head scans the records in any one of a plurality of trick mode trajectories, either sequential columns or sequential rows are updated according to the intraframe data.

In yet another aspect, the invention includes a video signal processor comprising a post-processor for receiving a plurality of records having intraframe and other data positioned within the records, the intraframe data positioned within the records such that when the records are scanned in any one of a plurality of trick-mode trajectories, either sequential vertical columns or sequential horizontal rows of a tessellation of at least a portion of a video screen are updated according to the intraframe data, for separating the records into the intraframe data and the other data, and for assembling a plurality of digital output signal frames with the intraframe data and other data in random positions; and an output terminal.

It is to be understood that both the foregoing general description and the following detailed description are exemplary and explanatory, and are intended to provide further explanation of the invention as claimed.

DESCRIPTION OF THE DRAWINGS

The accompanying drawings are included to provide a further understanding of the invention and are incorporated in and constitute a part of the specification, illustrate embodiments of the invention, and together with the description serve to explain the principles of the invention.

FIG. 3 is a block diagram of a pre-processor shown in FIG. 2;

FIG. 4 is a block diagram of a post-processor shown in FIG. 2;

FIG. 5 is a diagram showing the structure of a "track" and its component syncblocks.

DETAILED DESCRIPTION OF THE PREFERRED EMBODIMENTS

Reference will now be made in detail to the present preferred embodiments of the invention, examples of which are illustrated in the accompanying drawings.

Figure 1A:
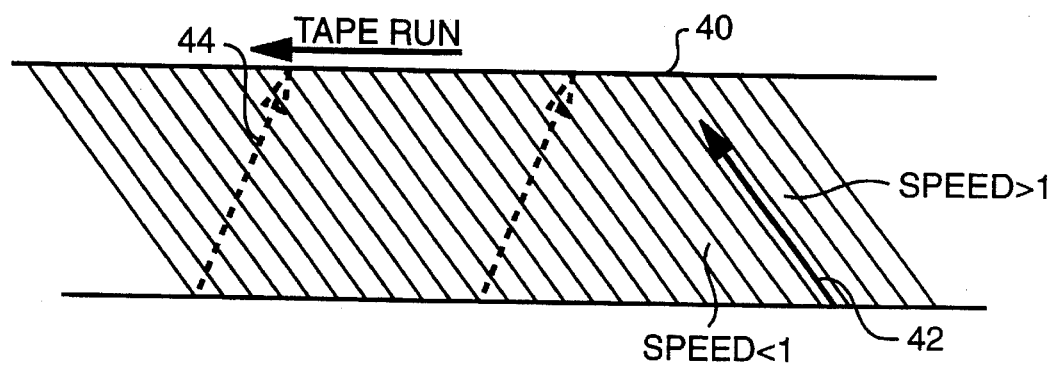
FIG. 1A is a diagram of a recording tape depicting recording tracks and a fast forward trick mode trajectory.
Figure 1B:
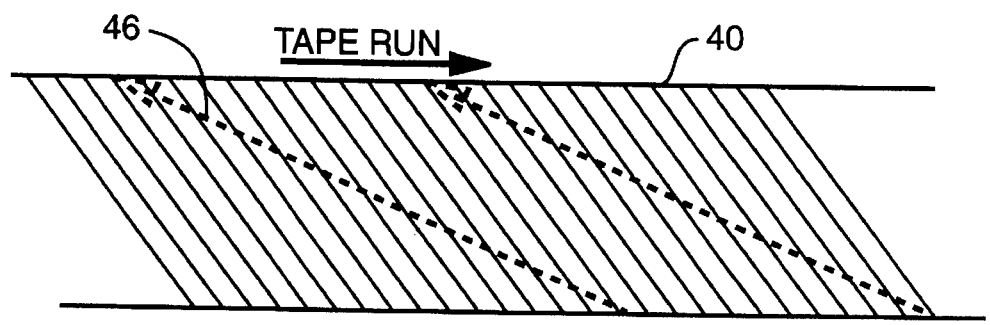
FIG. 1B is a diagram of a recording tape depicting recording tracks and a fast reverse trick mode trajectory.
Figure 2:
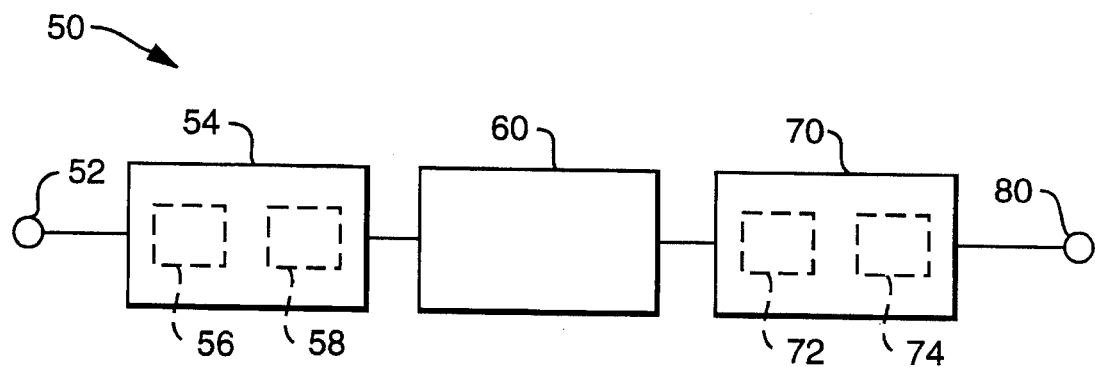
FIG. 2 is a block diagram of a digital VCR system including a pre-processor, a record/play deck, and a post-processor.

A representative block diagram of a video processing system, such as a VCR, is shown in FIG. 2. The system is designated generally by reference numeral 50.

In accordance with the invention, an input terminal is provided for receiving a digital input signal comprising a plurality of input frames, each of the input frames including intraframe data and other data in random positions. As broadly embodied herein, input terminal 52, of a type which is well known in the art, receives an input bit stream in the form of frames of data. The input frames have the MPEG format for digital data, including header information, followed in a prescribed order by I-data, P-data, and B-data.

In accordance with the invention, a pre-processor separates the input frames into the I-data and the other data, the preprocessor being preprogrammed with a tessellation of at least a portion of a video screen, the tessellation including vertical columns and horizontal rows, and constructs a plurality of records from the I-data and the other data with the I-data positioned within each record such that when a video recorder head scans the records in any one of a plurality of trick mode trajectories either sequential columns or sequential rows of the tessellation are updated according to the I-data.

As broadly embodied in FIGS. 2 and 3, pre-processor 54 receives the input data frames from input terminal 52. As further broadly embodied herein, pre-processor 54 includes a syntax decoder 56, a partial variable length decoder (VLD) 58, and a trick play data extractor 59. Syntax decoder 56 comprises a transport layer decoder 56a and a MPEG-2 header decoder 56b.

In accordance with the invention, pre-processor 54 separates the input frames into the data components of I-data, B-data, and P-data, then reassembles the data into "records" (defined below). These records will be recorded on a recording medium. The reassembly process, including the preprogrammed aspects and the functions performed by pre-processor 54, are described below.

The function of pre-processor 54 is to process the input data, which is in a transport packet format, into a form that is suitable for recording onto the recording medium in both a regular playback mode and a trick-play mode.

For the regular playback mode, pre-processor 54 breaks the input data into fixed-length portions equal to the syncblock size, and adds the necessary syncblock information to the result. The term "syncblock" is well-known in the VCR community and refers to the smallest addressable unit in a track. The output data is recorded in the normal playback area of the recording medium.

For the trick-play case, the input data first is fed to transport layer decoder 56a. Transport layer decoder 56a extracts transport header information, and generates a "program elementary stream" (PES). The header of the PES then is decoded to result in an MPEG-2 video stream. This stream then is fed to MPEG-2 header decoder 56b, and then to partial VLD 58. Partial VLD 58, with the aid of the MPEG-2 header decoder and the algorithm described below, extracts an appropriate number of codewords from each DCT block, packages the result into syncblocks, and adds the required syncblock information. A suitable partial VLD chip for use with the invention can be prepared, for example, using an L64750/51 chip, which is available commercially from the LSI Logic Corporation.

The input data stream can be described in terms of its "group of picture" (GOP). A GOP is defined in MPEG-2 as "a series of one or more pictures intended to assist random access into the sequence." For purposes of the present invention, the length of GOP is represented by "N" (frames), the coded bit rate of the input data stream is represented by "B" (bits/sec.) and the capacity of a recording medium, e.g., a magnetic tape, is represented by "C" (bits/sec.).

Structuring the records to provide a viewable picture in both FF and FR involves two broad considerations. The first consideration is to construct the records such that the I-data can be decoded. Accomplishing this result requires positioning the I-data in locations which will be traced by a video recorder head at different FF speeds and different FR speeds. Although the invention can be used with a video recorder in which the head always returns to a preselected starting position, i.e., the beginning of a track, prior to performing a FF or FR scan, the preferred embodiment of the invention enables the data to be scanned in FF and FR and produce a viewable picture with the video recorder head starting from any position, independent of where the head is on a track when FF or FR is activated. The second consideration is that it is preferable to use any excess capacity of the recording medium to increase the quality of the picture reproduced in the trick-play mode. For example, the quality of a picture that is reproduced in FF or FR will be improved if excess tape capacity is used to repeat some of the I-data. As used herein, excess capacity of a recording medium is calculated as "C-B-H" bits/sec, with "H" representing housekeeping bits for the video processing system, such as syncblock headers, forward error correction (FEC), and syncblock identification (ID) as shown in FIG. 5.

Preferably, the pre-processor 54 will be preprogrammed with certain information, which can vary under different applications of the invention. As broadly embodied herein, pre-processor 54 is preprogrammed with the capacity of the recording medium in use, the "primary" trick play speeds of the video recorder, and a "tessellation" of at least a portion of a video screen.

Recording medium capacity was discussed above. The "primary" speeds and screen "tessellation" are discussed below.

Certain speeds of FF and FR are the most commonly used as trick mode speeds by VCR manufacturers. These FF and FR speeds are referred to as "primary" trick mode speeds, and are denoted here by the symbols PS(1), PS(2), and so on. As broadly embodied herein, the pre-processor 54 is preprogrammed with at least the primary trick mode speeds. It is also preferred that FF and FR speeds other than the primary trick mode speeds be preprogrammed as well; for example, speeds S(1), S(2), and so on. In a typical FF trace, with the recorder head moving at speed S(1)>1 the recorder head traces (1/S(1)−I) of each track. Likewise, in a typical FR trace, for a speed of S(2)<0, the recorder head traces 1/(−S(2)+1) of each track. These areas of each track traced for a given trick mode speed are referred to herein as "records," and designated as record (S1), record (S2), and so on. Furthermore, for each FF speed there exists a corresponding FR speed which results in a record of the same length, such as FF speed +9, and FR speed −7. These two trick mode speeds are referred to as "duals" of one another.

Because the probability of error is higher at the boundaries of the recording medium tracks during FF and FR scans, it is preferable to use only the center portion of each record to store the I-data. The center portion, corresponding to approximately ½ of the total available capacity of each record, is calculated as follows. Letting "T" denote the number of syncblocks in each track (in bytes), each track has a length of SBH bytes. SB bytes of each track are available for storing data. Based on the above, the length of each record, for integer "i," would be T/S(i) which would contain rL=T/(S(i)×SBH) syncblocks, and therefore rL×SB/2 bytes to store the I-data that can be retrieved with low probability of error. Calculating the size of the records in which I-data is to be recorded can occur in two ways. First, the record length can be preprogrammed into the system by the manufacturer. However, it is preferred that the invention be adaptable for use with recording mediums of various capacities. Therefore, in the preferred embodiment, the pre-processor 54 will be programmed to perform the preceding calculation for each recording medium, in order to provide the most flexibility possible.

Based on the primary speed of interest, PS=PS(1)>0, the dual primary speed is dual dps=–ps+2. Accordingly, the capacity of each record is rL x SB/2 with rL=T/(ps×SBH). Preferably, the pre-processor 54 will pace the I-data in these records, while simultaneously satisfying the following three design constraints: (1) the low frequency I-data should be formatted on the available track of the recording medium in such a fashion that, independent of the track position of the recorder head at the start of trick-play mode, a viewable picture is created; (2) the scanned data on the recording medium during the trick-play mode should have spatial continuity; and (3) the format of the data on the recording medium should support multispeed mode.

Preferably, the pre-processor 54 is preprogrammed with the following information regarding at least a portion of the video screen. Since the recorder head scans PS-1 records in one trace, the video display screen is divided into PS-1 vertical columns. Given the capacity of each record, each vertical column is then divided into a number of horizontal rows. The resulting division is a "tessellation" of the screen into non-overlapping rectangles, referred to as "segments." The number of vertical columns are chosen so that the resulting resolution of each segment, determined by the capacity of the record, is acceptable. Generally, the closer together the vertical columns are placed, the higher will be the resultant resolution. The number of vertical columns is denoted "vd." Furthermore, it is to be understood that the vertical columns and horizontal rows can be interchanged. That is, it is within the scope of the invention to divide the video screen into (PS-1) horizontal rows, and decide on the number of vertical columns based on the capacity of the recording medium.

Many options exist for preprogramming the tessellation of the display screen. For example, it is within the scope of the invention to allow the viewer to control the precise tessellation, whether in terms of resolution or amount of the video screen included in the tessellation. It also is within the scope of the invention to preprogram a "default" tessellation if the viewer chooses not to control the system. It also is within the scope of the invention for the manufacturer to preprogram only a single tessellation, or a set number of tessellations.

In accordance with the invention, given the capacity of each record and the spatial area of each segment of the tessellation, pre-processor 54 stores the low-resolution I-data in the records using the following algorithm.

Step 0: Given the record capacity (CR), the bitstream related to the spatial area to be mapped into the record, and end-of-block (eob) length and code, calculate the total bits required for eob's CEOB (number of blocks in the spatial area times the length of eob). The remaining capacity, C1=CR–CEOB, can be used for I-data. Set total assigned bits, b, to zero, and number the blocks in the spatial area sequentially. If C1<0, go to Step 1'.

Step 1: If b<C1, take the next code-word from the representation of the block. Otherwise go to Step 3.

Step 1': Choose dc coefficients of as many blocks as the capacity allows. No eob's are included in the syncblocks. Arrange the selected dc coefficients in the syncblock. Exit.

Step 2: Increment the block number and set b=b+(length of last code-word selected). Go to Step 1.

Step 3: Remove the last code-word selected.

Step 4: Arrange the selected code-words in the syncblocks according to their block representation and sequential numbering of the block and insert the appropriate eob at the end of each block. Exit.

The issue at this point is the appropriate correspondence between the records on the recording medium and the spatial position that they represent on the video screen, in order to satisfy the spatial continuity design criterion. As embodied herein, pre-processor 54 resolves this issue by allowing horizontal updating of the screen in the FF mode, and vertical updating of the screen in the FR mode. In other words, during the FF mode, sequential horizontal rows are updated on the screen according to the I-data, whereas in the FR mode, sequential vertical columns on the screen are updated. Moreover, although the above embodiment is preferred, it is within the scope of the invention for the FF mode to update sequential vertical columns on the screen, and the FR mode to update sequential horizontal rows.

As broadly embodied herein, pre-processor 54 organizes the I data as follows. Assume that the segments on the tessellation are numbered from left to right and top to bottom from 0 to PS1×vd−1. Further, assume that the record number "r" is denoted in the track number, "t," containing the information regarding segment number, "seg," in the GOP number, "gop," by the four-tuple [r, t, seg, gop]. Pre-processor 54 organized the records with I-data positioned such that, when the recorder head performs one scan in FF, it picks up I-data corresponding to one horizontal row (or alternatively one vertical column) of the tessellation. Likewise, when the recorder head performs one scan in FR, it picks up I-data corresponding to one vertical column (or alternatively one horizontal row). For example, given [r, t, seg, gop], we will have [r+1, t+1, seg+1, gop] and [r−1, t−1, seg+s1, gop] for FF and FR respectively.

One example of the construction of system frames with I-data placed according to the invention is shown broadly in Table 1 below. The starting point for the structure is the first track, t=0, and the first GOP, gop=0. Starting at t=0, gop=0, pre-processor 54 makes the following assignment: [r, t=r, seg=r, gop=0]for r=0, 1, 2, ... , ps−1. The result looks like [0,0,0,0], [1,1,1,0], [2,2,2,0], [3,3,3,0], [4,4,4,0]. . . [PS−2, PS−2,PS−2,0], [PS−1,PS−1,PS−1,0]. Next, to satisfy the FR continuity condition, pre-processor 54 proceeds as follows: [r,t=r+2,PS+1+r,0], for r=0,1,2 ... PS−2, and [PS−2,PS,S1, 0] The pattern depicted in Table 1 below can now be seen. The first row of the Table shows the track numbering. The records with no number indicate the remaining bits associated with I-data and inter-data. This two-dimensional structure has a height of S and width of vd.

TABLE 1

| t=0 | t=1 | t=2 | t=3 | 4 | 5 | 6 | 7 | s−3 | s−2 | s−1 | s | s+1 | s+2 |
|---|---|---|---|---|---|---|---|---|---|---|---|---|---|
|  |  |  |  |  |  |  |  |  |  | s−1 |  | s | 2s+1 |  |
|  |  |  |  |  |  |  |  |  | s−2 |  | 2s−1 |  | 2s | 3s+1 |
|  |  |  |  |  |  |  |  |  |  | 2s−2 |  | 3s−1 |  | 3s |
|  |  |  |  |  |  |  |  | — | 2s−3 |  | 3s−2 |  | 4s−1 |  |
|  |  |  |  |  |  |  | 7 |  | 3s−3 |  | 4s−2 |  |  |
|  |  |  |  |  |  | 6 | s+6 | — |  | 4s−3 |  |  |  |
|  |  |  |  |  | 5 | s+5 | 2s+5 |  | 4s−4 |  |  |  |  |
|  |  |  |  | 4 | s+4 | 2s+4 | 3s+4... |  |  |  |  |  |  |
|  |  |  | 3 | s+3 | 2s+3 | 2s+4 | — |  |  |  |  |  |  |
|  |  | 2 | s+2 | 2s+2 | 2s+3 | 3s+3 |  |  |  |  |  |  |  |
|  | 1 | s+1 |  |  |  |  |  |  |  |  |  |  |  |
| 0 |  |  |  |  |  |  |  |  |  |  |  |  |  |

The-above format is suitable for any recording medium, e.g., a magnetic tape, that has the minimum requirements for storing the encoded data, since there are overhead requirements for separating low and high resolution data.

Figure 6:
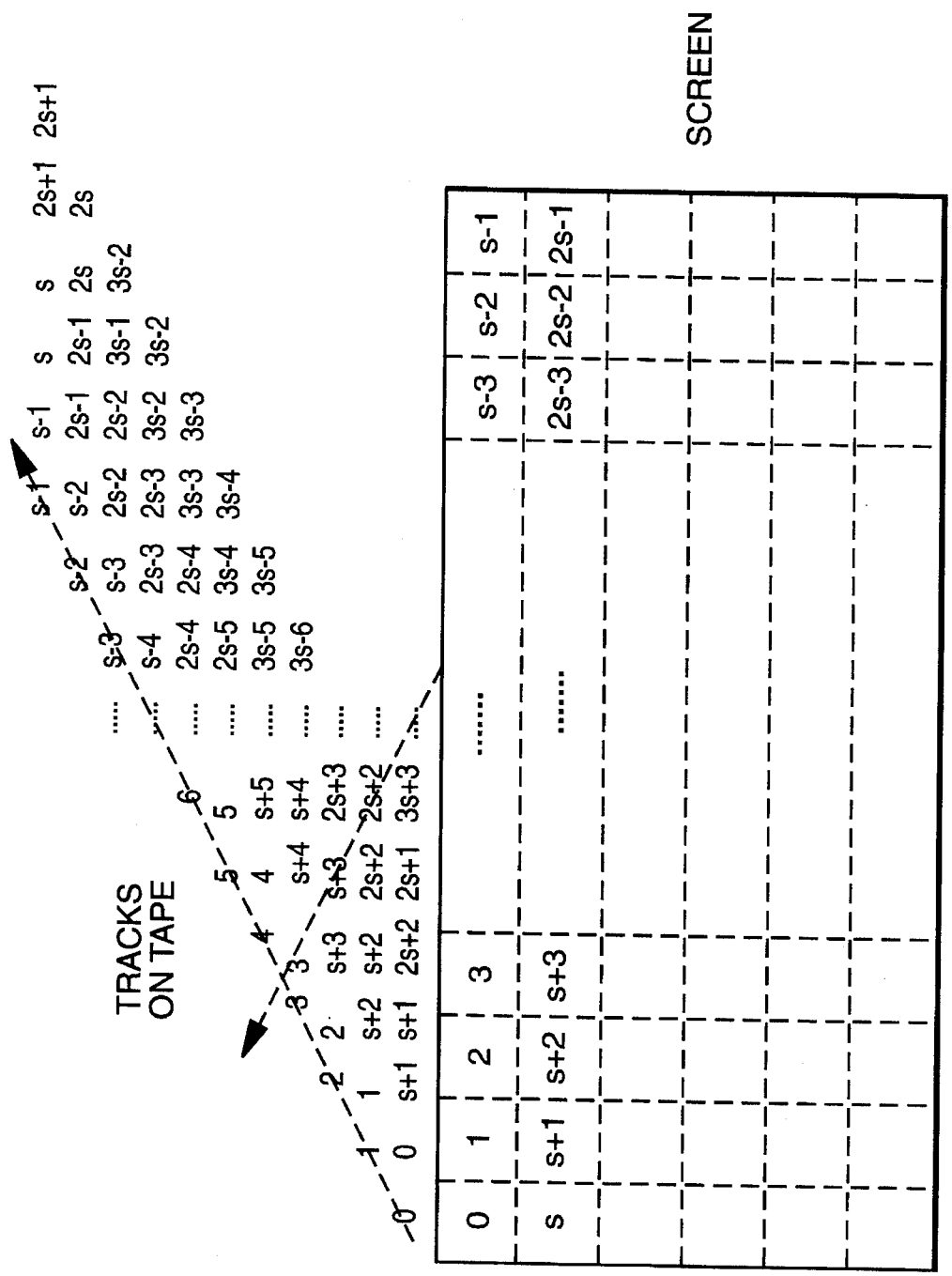
FIG. 6 is a diagram depicting the updating of a video screen as a recorder head scans, in a FF and FR mode, I-data that has been positioned according to the present invention.

An example of how a tessellation of a video screen is refreshed with I-data, placed according to the invention, during FF Or FR scan, is shown in FIG. 6 If the recorder head, operating at speed 3, starts at track 1, it would not pick up any I-data in this GOP. Therefore, the pre-processor 54 positions the data in the next GOP, gop=1, in a fashion that it could be picked up by the recorder head. The means that the data would be positioned at a track in the next GOP which is a multiple of s apart from track 1 (i.e., 1+js, j=1,2,3 ...). In the next GOP, gop=1, the pre-processor 54 would provide a cyclic shift of the above structure by one slanted column, starting at a track that will be a multiple of s apart from track 0. In this manner, the picture on the video screen is cyclically refreshed. The same procedure is followed for gop=3, and for subsequent gops, until GOP=vd. After that, the same structure is repeated (vd+i) =structure (i) for all integers i with the appropriate starting track. Using this procedure, the video screen will be fully updated in 2 vd GOPs. It further can be seen from FIG. 4 that columns of the screen can be refreshed in the FR mode.

The above example is suitable for use with a recording medium having little excess capacity. If the recording medium has some extra capacity, pre-processor 54 can use the extra capacity to store additional I-data. This extra I-data reduces the refresh time, thereby making the refresh process more independent of the starting track position. One preferred approach is for the pre-processor 54 to duplicate the I-data contained in the even numbered tracks into the odd-numbered tracks as shown in Table 2, below:

completely updated when vd scans are completed in the FF mode, which depending on the recording medium capacity, might require at most vd GOPs.

The invention further offers the capability of favoring one trick mode speed over others in both FF and FR, or balancing the two modes as desired. Assuming that sufficient tape capacity exists, additional I-data may be inserted to provide a better picture in the FR, by using a structure shown in Table 3 below. For the table, it is assumed vd=3. The new information appears in italics:

TABLE 2

| t=0 | t=1 | t=2 | t=3 | 4 | 5 | 6 | 7 | s−3 | s−2 | s−1 | s | s+1 | s+2 |  |  |
|---|---|---|---|---|---|---|---|---|---|---|---|---|---|---|---|
|  |  |  |  |  |  |  |  |  |  | s−1 | s−1 | s | s | 2s+1 | 2s+1 |
|  |  |  |  |  |  |  |  |  | s−2 | s−2 | 2s−1 | 2s−1 | 2s | 2s |  |
|  |  |  |  |  |  |  |  | s−3 | s−3 | 2s−2 | 2s−2 | 3s−1 | 3s−1 |  |  |
|  |  |  |  |  |  |  |  | — | s−4 | 2s−3 | 2s−3 | 3s−2 | 3s−2 |  |  |
|  |  |  |  |  |  |  | 6 | — | 2s−4 | 2s−4 | 3s−3 | 3s−3 |  |  |  |
|  |  |  |  |  |  | 5 | 5 | — | 2s−5 | 3s−4 | 3s−4 |  |  |  |  |
|  |  |  |  | 4 | 4 | s+5 | s+5 | — | 3s−5 | 3s−5 |  |  |  |  |  |
|  |  |  | 3 | 3 | s+4 | s+4 | 2s+4 | — | 3s−6 |  |  |  |  |  |  |
|  |  | 2 | s+3 | s+3 | 2s+4 | 2s+4 | — |  |  |  |  |  |  |  |  |
|  | 1 | 1 | s+2 | s+2 | 2s+3 | 2s+3 | — |  |  |  |  |  |  |  |  |
| 0 | 0 | s+1 | s+1 | 2s+2 | 2s+2 | 3s+3 | — |  |  |  |  |  |  |  |  |

Furthermore, there are s different starting positions for the FF speed of interest, s. In this case, the video screen can be

TABLE 3

| t = 0 | t = 1 | t = 2 | t = 3 | 4 | 5 | 6 | 7 | s − 3 | s − 2 | s − 1 |
|---|---|---|---|---|---|---|---|---|---|---|
| | | | | | | | | | | s − 1 |
| | | | | | | | | | s − 2 | s − 2 |
| | | | | | | | | s − 3 | s − 3 | 2s − 2 |
| | | | | | | | | s − 4 | 2s − 3 | 2s − 3 |
| | | | | | | 6 | — | 2s − 4 | 2s − 4 | 3s − 3 |
| | | | | | 5 | 5 | — | 2s − 5 | 3s − 4 | 3s − 4 |
| | | | | 4 | 4 | s + 5 | — | 3s − 5 | 3s − 4 | |
| 3s + 1 | 3s + 2 | 3s + 2 | 3 | 3 | s + 4 | s + 4 | — | 3s − 6 | | |
| 2s + 1 | 2s + 1 | 2 | 2 | s + 3 | s + 3 | 2s + 4 | — | | | |
| s | 1 | 1 | s + 2 | s + 2 | 2s + 3 | 2s + 3 | — | | | |
| 0 | 0 | s + 1 | s + 1 | 2s + 2 | 2s + 2 | 3s + 3 | — | | | |
| | | | s | s + 1 | s + 2 | | | | | |
| | | | s − 1 | s | s | 2s + 1 | 2s + 1 | | | |
| | | | 2s − 1 | 2s − 1 | 2s | 2s | 3s + 1 | 3s + 1 | | |
| | | | 2s − 2 | 3s − 1 | 3s − 1 | 3s | 3s | s + 1 | s + 1 | |
| | | | 3s − 2 | 3s − 2 | | | | | | |
| | | | 3s − 3 | | | | | | | |

Furthermore, additional FR data can be added in other tracks so that each scan of the recorder head will correspond to more than one column of update.

In accordance with the invention, means are provided for recording the data records on a recording medium. As broadly embodied in FIG. 2, recording means comprise a video recorder head 60. As broadly embodied herein, recorder head 60 is part of a helical scan system in a VCR, used to record and playback magnetic tapes. However, the invention is not limited to use with magnetic tapes. Other recording mediums, such as video disks, can be used, and recorder head 60 can be a head of a disk recorder as is well known in the art.

In another aspect of the invention, a video signal processor is provided that comprises a post-processor for receiving a plurality of records having I-data and other data, the I-data positioned within the records such that when the records are scanned in any one of a plurality of trick mode trajectories, either sequential vertical columns or sequential horizontal rows of a tessellation of at least a portion of a video screen are updated according to the I-data, for separating the records into the I-data and other data, and for assembling a plurality of digital output signal frames with the I data and other data in random positions.

As broadly embodied in FIGS. 2 and 4, a post-processor 70 is provided that includes a trick play syncblock extractor 72, stuffing bits 73, and a transport packetizer 74. An output terminal 80 is operatively coupled to post-processor 70 to output the signal from post-processor 70 to, e.g., a digital HDTV set.

As embodied herein, post-processor 70 receives a bit stream of data read by recorder head 60. When recorder head 60 traverses the recording medium in a trick play trajectory, the data stream will include the data recorded in the manner described above. Post processor 70 disassembles the incoming bit stream into components of I-data, P-data and B-data, and reassembles these data components into output frames in the MPEG format. These output frames are sent to output terminal 80.

The function of post-processor 70 is to repackage the output of the recording medium into a format suitable for a receiver, e.g., a digital HDTV.

In the regular playback mode, post-processor 70 simply removes the syncblock headers and concatenates the results. The resulting data automatically is in the required format.

In the trick-play case, post-processor 70 must create the transport layer data. After extracting the syncblock information at trick play syncblock extractor 72, bits are stuffed to the MPEG-2 video stream at position 73 to create the required bit rate for the video. The appropriate MPEG-2 headers then are added. The output is fed to transport packetizer 74, which packages the input into first a program elementary stream, then adds the transport packet header. The result will be an HDTV system level bitstream.

As broadly embodied herein, when the recorder head runs in FF or FR, the pictures on the video screen will be updated, preferably in sequential horizontal rows in FF, and sequential vertical columns in FR. When the FF or FR is the primary speed, sequential rows or columns, respectively, are updated in their entirety, which provides the most viewable picture. When a speed other than the primary speed for FF and FR is used, the sequential rows and columns, respectively, are partially updated, which provides a slightly less preferable picture, but one that is still viewable. Furthermore, as mentioned earlier, the orientation can be changed so that the FF trick mode updates sequential vertical columns and the FR trick mode updates sequential horizontal rows.

Example

Assume that N=9, there are 36 tracks to store one GOP (at encoding rate of 18 Mbps and tape capacity of 25 Mbps), that each track consists of 360 syncblocks, and each syncblock has 65 bytes of available data for video (excluding the housekeeping data). Each record has an available capacity of 360 (syncblocks/track)/8(records/track)×65 (bytes/syncblock)×8 (bits/bytes)=23,400 bits/records, of which ½ or approximately 12,000 bits is available for FF/FR at a very low probability of error. If we assume that ⅓ of GOP bits is allocated to I-data, we come up with 18 Mbps/30×9/3=1.8 Mb/I-frame. The pre-processor is programmed with +9 as the primary FF speed with its dual FR speed of −7. Based on this assumption, divide the screen into 8 vertical columns of 11 macroblocks length. Since there are 12000 bits available for each segment, the segments will be 15 macroblocks high (960/4)/16) which is equivalent to vd=4. Therefore, each segment contains 165 macroblocks and each macroblock is assigned 12000/165=72 bits for low-resolution data. In this format, more information related to −7 speed has been added, for the sake of balance, which are shown in italics in Table 4 below. The non-italicized numbers are appropriately shifted in a cyclic fashion in the next three GOP's so that, independent of the starting track, a different row is updated on the screen in the following three GOP's making a complete refresh of the screen in four GOP's. Furthermore, the information on the traced records at speed +9, when the scanning head starts at a numbered track, is slightly changed to improve the quality of FF/FR mode at other speeds.

TABLE 4

| t = 0 | t = 1 | t = 2 | t = 3 | 4 | 5 | 6 | 7 | s − 3 | s − 2 | s − 1 | s | s + 1 | s + 2 | | | | | | | |
|---|---|---|---|---|---|---|---|---|---|---|---|---|---|---|---|---|---|---|---|---|
| 8 | 11 | 17 | | | | | 7 | 2 | 8 | 11 | 17 | 20 | 26 | 29 | 3 | 6 | 12 | | | |
| | 16 | 19 | | | | 6 | 1 | 15 | 10 | 16 | 19 | 25 | 28 | 2 | 5 | 11 | 14 | 20 | | |
| | | 24 | | | 5 | 0 | 14 | 9 | 23 | 18 | 24 | 27 | 1 | 4 | 10 | 13 | 19 | 22 | 28 | |
| | | | | 4 | 7 | 13 | 8 | 22 | 17 | 31 | 26 | 0 | 3 | 9 | 12 | 18 | 21 | 27 | 30 | 4 |
| 20 | 26 | | 3 | 6 | 12 | 15 | 21 | 16 | 30 | 25 | 7 | | | | | | | | | |
| 25 | 28 | 2 | 5 | 11 | 14 | 20 | 23 | 29 | 24 | 6 | | | | | | | | | | |
| 27 | 1 | 4 | 10 | 13 | 19 | 22 | 28 | 31 | 5 | | | | | | | | | | | |
| 0 | 3 | 9 | 12 | 18 | 21 | 27 | 40 | 4 | | | | | | | | | | | | |

Alternative pre-processor and post-processor designs are possible. Different recorder heads and different recording mediums may be used. The functions of the pre-processor and post-processor can be combined into a single hardware component. Additional advantages and modifications will occur to persons skilled in the art. For this reason, the invention is not limited to the specific details and representative devices described above. Departures may be made from such details without departing from the spirit or scope of the invention. The invention is defined by the appended claims and their equivalents.

I claim:

1. A method of processing video signals comprising:

receiving a digital video input signal comprising a plurality of input frames, each of the input frames including intraframe data and other data in random positions;

separating the input frames into the intraframe data and the other data;

programming a tessellation of at least a portion of a video screen, the tessellation including vertical columns and horizontal rows; and assembling a plurality of records from the intraframe data and other data with the intraframe data positioned within the records such that when a video recorder head scans the record in any one of a plurality of trick-mode trajectories, either sequential columns or sequential rows of the tessellation are updated according to the intraframe data.

2. A method according to claim 1, further comprising a step of recording the records on a recording medium.

3. A method according to claim 1, wherein the plurality of trick-mode trajectories include a primary fast forward trajectory.

4. A method according to claim 3, wherein the records are assembled such that the sequential columns or sequential rows are updated in their entirety when the recorder head scans at the primary fast forward trajectory.

5. A method according to claim 3, wherein the records are assembled such that the sequential columns or sequential rows are partially updated when the recorder head scans at a fast forward trajectory other than the primary fast forward trajectory.

6. A method according to claim 1, wherein the plurality of trick-mode trajectories include a primary fast reverse trajectory.

7. A method according to claim 6, wherein the records are assembled such that the sequential columns or sequential rows are updated in their entirety when the recorder head scans at the primary fast reverse trajectory.

8. A method according to claim 6, wherein the records are assembled such that the sequential columns or sequential rows are partially updated when the recorder head scans at a fast reverse trajectory other than the primary fast reverse trajectory.

9. A method according to claim 1, wherein the tessellation is programmed according to a given recorder head speed.

10. A method according to claim 1, wherein the tessellation is programmed according to a given capacity of a recording medium.

11. A method according to claim 1, wherein the records are assembled such that the sequential columns or sequential rows are updated when the recorder head commences its trick-mode trajectory from a preselected position.

12. A method according to claim 1, wherein the records are assembled such that the sequential columns or sequential rows are updated when the records head commences its trick mode trajectory from any position.

13. A video signal processor comprising:

an input terminal for receiving a digital video input signal comprising a plurality of digital input frames, each of the input frames including intraframe data and other data in random positions; and a pre-processor for separating the input frames into the intraframe data and other data, and for assembling a plurality of records according to a preprogrammed tessellation of at least a portion of a video screen, the tessellation including vertical columns and horizontal rows, with the intraframe data positioned within the records such that when a video recorder head scans the records in any one of a plurality of trick mode trajectories, either sequential columns or sequential rows are updated according to the intraframe data.

14. A video signal processor according to claim 13, further comprising means for recording the records onto a recording medium.

15. A video signal processor according to claim 13, wherein the plurality of trick-mode trajectories include a primary fast forward trajectory.

16. A video signal processor according to claim 15, wherein the pre-processor assembles the records such that the sequential columns or sequential rows are updated in their entirety when the recorder head scans at the primary fast forward trajectory.

17. A video signal processor according to claim 15, wherein the pre-processor assembles the records such that the sequential columns or sequential rows are partially updated when the recorder head scans at a fast forward trajectory other than the primary fast forward trajectory.

18. A video signal processor according to claim 13, wherein the plurality of trick-mode trajectories include a primary fast reverse trajectory.

19. A video signal processor according to claim 18, wherein the pre-processor assembles the records such that the sequential columns or sequential rows are updated in their entirety when the recorder head scans at the primary fast reverse trajectory.

20. A video signal processor according to claim 18, wherein the pre-processor assembles the records such that the sequential columns or sequential rows are partially updated when the recorder head scans at a fast reverse trajectory other than the primary fast reverse trajectory.

21. A video signal processor according to claim 13, wherein the tessellation is programmed according to a given recorder head speed.

22. A video signal processor according to claim 13, wherein the tessellation is programmed according to a recording medium capacity.

23. A video signal processor according to claim 13, wherein the pre-processor assembles the records such that the sequential columns or sequential rows are updated when the recorder head commences its trick-mode trajectory from a preselected position.

24. A video signal processor according to claim 13, wherein the pre-processor assembles the records such that the sequential columns or sequential rows are updated when the recorder head commences its trick mode trajectory from any position.

25. A video signal processor comprising:

a post-processor for receiving a plurality of records having intraframe and other data, the intraframe data positioned within the records such that when the records are scanned in any one of a plurality of trick-mode trajectories, either sequential vertical columns or sequential horizontal rows of a tessellation of at least a portion of a video screen are updated according to the intraframe data, for separating the records into the intraframe data and the other data, and for assembling a plurality of digital output signal frames with the intraframe data and other data in random positions; and an output terminal for receiving the output signal frames.

* * * * *